May 6, 1941.   B. R. RUMBUTIS   2,240,578
TYPEWRITING MACHINE
Filed Dec. 13, 1938   7 Sheets-Sheet 2

INVENTOR.
Bernard R. Rumbutis
BY
ATTORNEY

May 6, 1941.  B. R. RUMBUTIS  2,240,578
TYPEWRITING MACHINE
Filed Dec. 13, 1938  7 Sheets-Sheet 4

INVENTOR.
Bernard R. Rumbutis
BY
W. M. Wilson
ATTORNEY

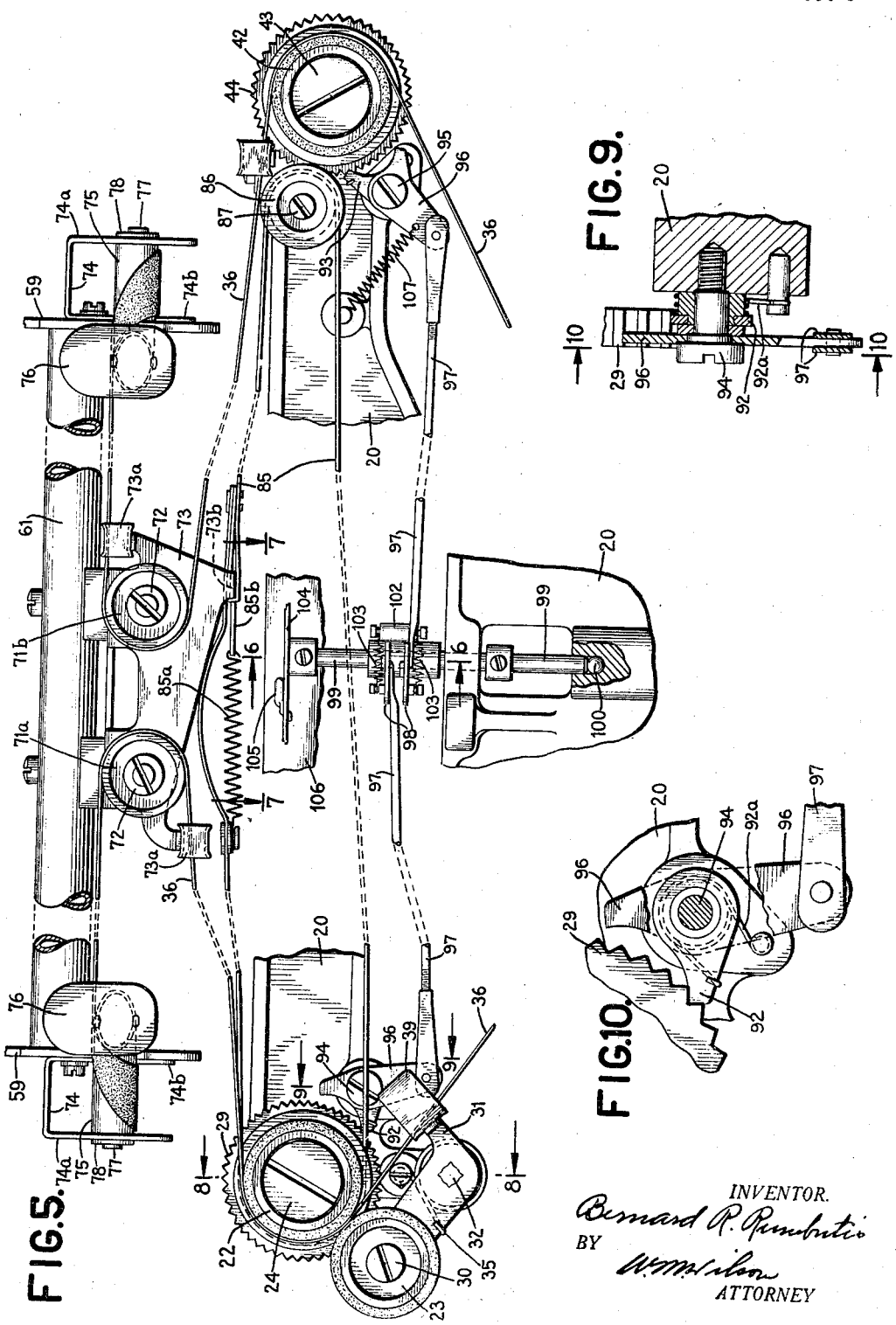

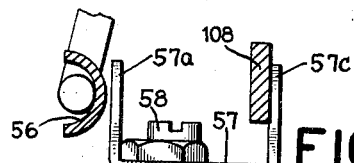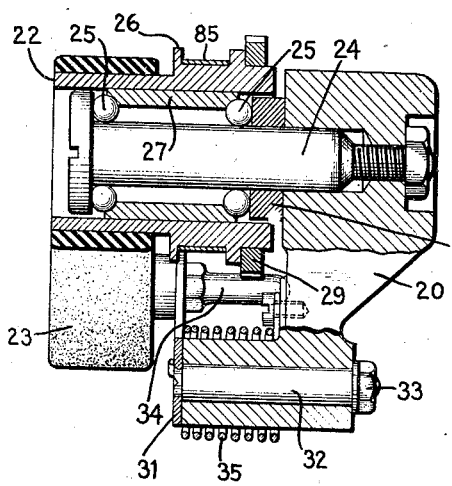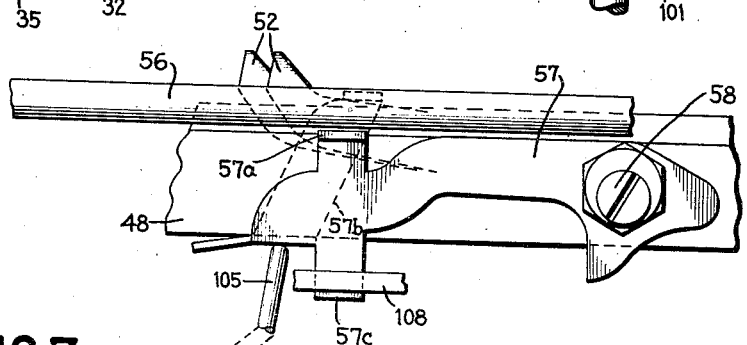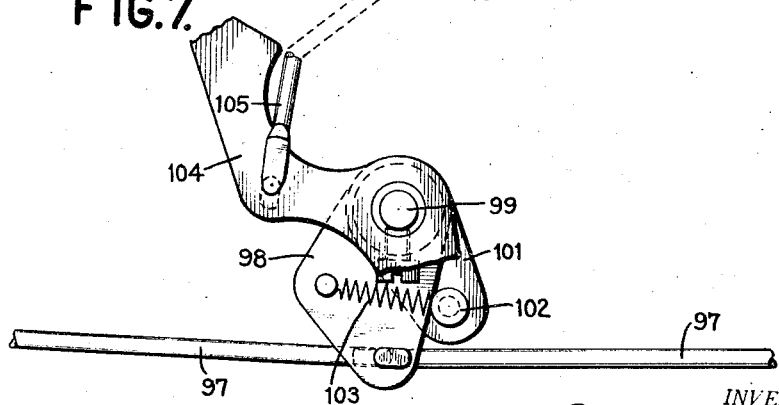

May 6, 1941.  B. R. RUMBUTIS  2,240,578
TYPEWRITING MACHINE
Filed Dec. 13, 1938  7 Sheets-Sheet 7

INVENTOR
Bernard R. Rumbutis
by
ATTORNEY

Patented May 6, 1941

2,240,578

UNITED STATES PATENT OFFICE 2,240,578

TYPEWRITING MACHINE

Bernard R. Rumbutis, Rochester, N. Y., assignor to International Business Machines Corporation, New York, N. Y., a corporation of New York Application December 13, 1938, Serial No. 245,365

16 Claims. (Cl. 197—151)

This invention relates to typewriting machines.

The broad object of the present invention is to provide an improved ribbon feeding mechanism suitable for the preparation of the master sheets used in duplicating machines and for the preparation of manifold copies.

An object is to improve the machine disclosed in application Serial No. 155,363, filed July 24, 1937, by John L. Petz. This application describes a mechanism wherein the movement of the carriage feeds an auxiliary ribbon which may be utilized for the preparation of master sheets in duplicating machines.

An object of the present invention is to simplify the construction of the machine disclosed in the aforesaid Petz application by reducing the size of the rather large and cumbersome frame mounted at the rear of the carriage which, in that machine had to be at least twice as long as the maximum travel of the carriage.

Another object is to provide means whereby the ribbon may be more completely exhausted of transfer material without, however, utilizing any portion of the ribbon more than once.

Another object is to improve the paper bail mechanism to prevent damage to the auxiliary ribbon in the event that the operator attempts to move the auxiliary ribbon to the typing position while the paper bail is in cooperation with the platen.

Another object is to provide means for preventing wasting of the ribbon for such operations of the machine as are not accompanied by the printing of characters as, for instance, when the carriage is moved by hand or by a tabulating operation.

An object is to improve the ribbon guides to prevent as far as possible the disagreeable results of scraping of the transfer material from the ribbon.

An object is to provide a ribbon feeding mechanism which produces an even feed and a more constant feed than the one disclosed in the aforesaid Petz application.

An object is to provide a feed mechanism for an auxiliary ribbon which is not dependent upon the friction of the ribbon in the guides to maintain the ribbon taut at the writing line.

An object is to provide a ribbon feeding mechanism in which the feeding of the ribbon is closely controlled at all times and by means of which a constant tension is maintained on the ribbon without risk of breakage thereof as a consequence of the inertia of the supply roll.

An object is to provide a means for preventing feeding of the auxiliary ribbon when the machine is not being used for the preparation of master sheets, carbon copies, or other work requiring the use of the auxiliary ribbon.

An object is to provide a movable means for supporting and guiding the auxiliary ribbon at the printing line operable to carry the auxiliary ribbon to an inactive position with means responsive to the movement of the ribbon to inactive position for preventing feeding of the auxiliary ribbon when it is not in use.

Further objects of the instant invention reside in any novel feature of construction or operation or novel combination of parts present in the embodiment of the invention described and shown in the accompanying drawings whether within or without the scope of the appended claims and irrespective of other specific statements as to the scope of the invention contained herein.

In the drawings:

Fig. 5 is a large scale view of the ribbon feeding and control mechanism.

Fig. 6 is a vertical section on the line 6—6 in Fig. 5.

Fig. 7 is a horizontal section on line 7—7 in Fig. 5.

Fig. 8 is a vertical section on the line 8—8 in Fig. 5.

Fig. 9 is a vertical section on the line 9—9 in Fig. 5.

Fig. 10 is a vertical section on the line 10—10 in Fig. 9.

The invention herein described is shown as applied to the well known "International" electric writing machine, formerly known as the "Electromatic," purely for convenience in description, and it will be understood that the invention may be applied to other typewriting machines as well. Since the herein described invention is concerned with the feeding of an auxiliary ribbon and is not concerned with the construction of the typewriting machine proper, except in respect to the carriage, the present description will be confined to the ribbon feeding mechanism and such parts of the machine as may be directly involved.

Figure 1:
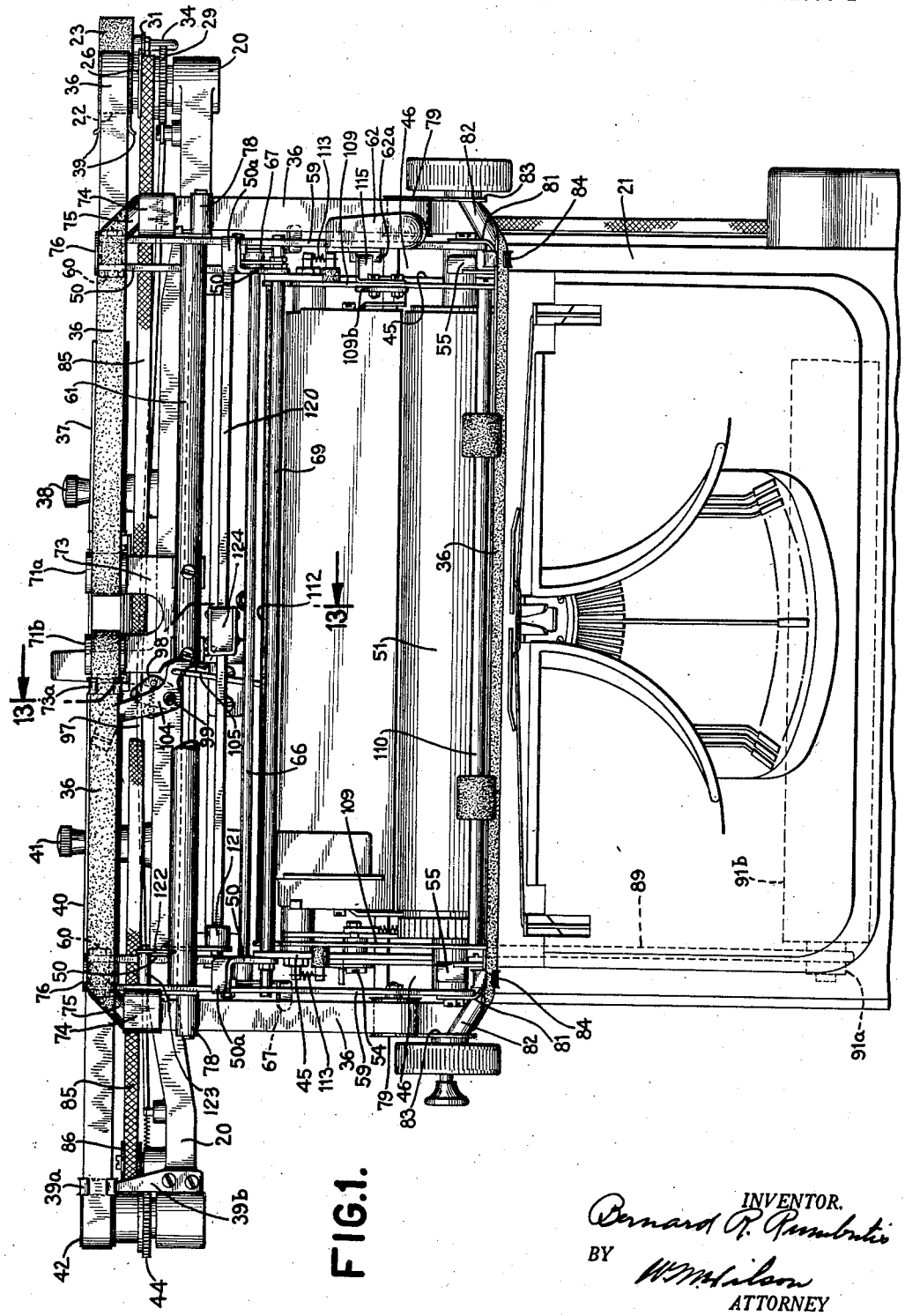
Fig. 1 is a plan view of the machine.

The ribbon feeding mechanism is mounted upon a long casting 20 which is secured to the base 21 of the typewriting machine. The casting 20 extends to right and left as shown in Fig. 1, beyond the base of the typewriting machine for a purpose which will be apparent hereinafter. The frame 20 at its right hand end (Fig. 1), or the left hand end as viewed in Fig. 2, rotatably supports a pair of ribbon feeding rollers 22, 23. The roller 22, as best shown in Fig. 8, has a resilient facing of some such material as rubber or cork of high frictional quality and is rotatably mounted on a stud 24 carried by a boss in casting 20 by means of anti-friction bearings comprising two rows of balls 25. The roller 22 is in the form of a hollow shell which is somewhat longer than its diameter and is turned to form a pulley 26. The rows of balls 25 roll on the shank of the stud 24 and are kept in spaced relation by a ball race 27 pressed into roller 22. The right hand row of balls 25 bears against a collar 28 on the stud 24 while the left hand row of balls bears against the inside of the slotted head of stud 24. Also secured to the roller 22 is a ratchet wheel 29 for a purpose which will be made clear hereinafter.

The roller 23 similarly has a resilient facing in contact with the facing on roller 22 and is rotatably mounted on a stud 30 (Figs. 2 and 5) which is carried by the end of a rock arm 31. This rock arm 31, as best shown in Figs. 3, 5, and 8, is secured to a stud 32 which is rotatable in a hole bored in a boss formed in the casting 20 and retained in the hole by means of a nut and washer generally designated 33. The stud 30 as shown in Figs. 1, 3, and 8 is secured on the arm 31 by a relatively long nut 34 which is turned down so as to be rounded at its ends to serve as a finger piece for the purpose of disengaging the roller 23 from the roller 22. Coiled around the boss in which the stud 32 is pivoted, is a torsion spring 35 which is hooked around one arm of the lever 31 and around a stud carried by the frame 20 so as to tend to rock the arm 31 clockwise in Fig. 5 to hold the roller 23 in contact with the roller 22.

The rollers 22, 23 are operative to withdraw the ribbon 36 from a ribbon supply spool 37. The spool 37 is removably rotatably mounted in a well known way at 38 on a boss formed in the casting 20. The ribbon 36 extends diagonally upward and to the left (Fig. 2) between the rollers 22 and 23, over the top of the roller 22 and thence horizontally to the right to one of a pair of rollers hereafter to be described which are mounted upon the carriage of the typewriter for the purpose of guiding the ribbon 36 to and from the rear ribbon guides on the carriage.

There is attached to one arm of the rock lever 31 a ribbon guide 39 which is U-shaped to provide two arms between which the ribbon 36 passes. In order to avoid the ribbon guide 39 scraping the ribbon 36, all the edges of the ribbon guide are flared as clearly shown in Figs. 2 and 3 whereby only round surfaces engage the edges and the uncoated side of the ribbon 36. It has been found from experience that in machines utilizing hectograph ribbons, the ribbon guides tend to scrape some of the material with which the ribbon is coated from the ribbon in the form of dust, then this dust settles upon the clothing of the operator, on the machine, and upon the surrounding desks. Since this material spreads when wet, it is highly desirable to reduce the scraping effect upon the ribbon to the smallest amount possible. It should also be mentioned that the uncoated side of the ribbon is shown by stippling in the drawings and faces upwardly as it is led from the supply roll 36 whereby the coated side does not rub upon the ribbon guide 39.

The ribbon is wound upon a storage spool 40 which is pivotally mounted at 41 (Fig. 2) in the casting 20. From the storage spool 40 the ribbon extends diagonally upwardly and to the right in Fig. 2 and around a roller 42 rotatably mounted on a stud 43 in the same general fashion as the roller 22. From the roller 42, the ribbon extends horizontally to the left and around roller carried by the carriage hereafter to be described. The roller 42 like the roller 22 has a ratchet wheel 44, the purpose of which will be made clear hereinafter.

Figure 2:
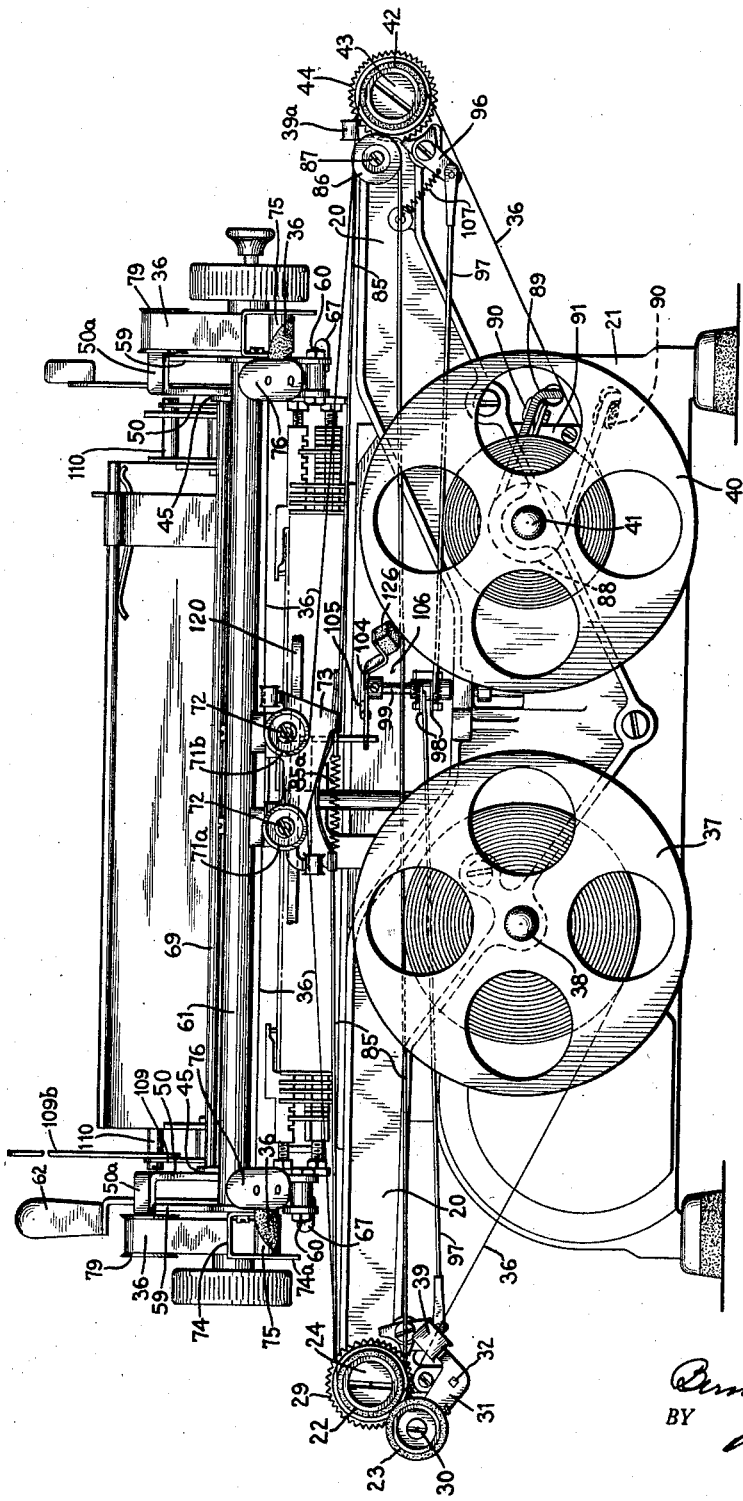
Fig. 2 is a rear elevation.
Figure 3:
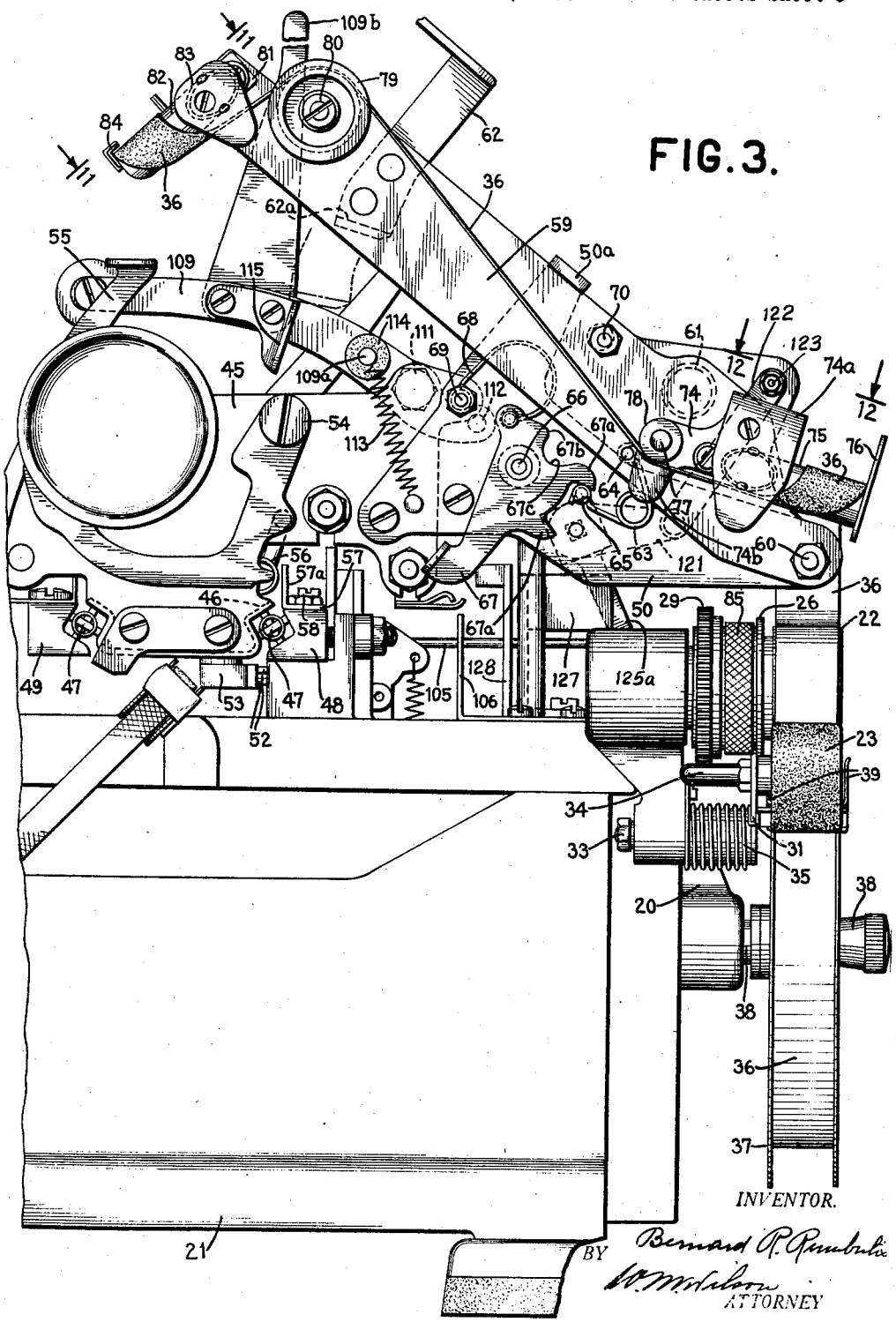
Fig. 3 is a right side elevation of the machine and shows the ribbon supporting and guiding frame in elevated position.

The main framework of the carriage, as shown in Figs. 1 and 2 comprises side plates 45 rigidly joined in the usual way by a channel-shaped member 46 (Fig. 3) which acts as a track for anti-friction roller trucks 47 which ride on the front rail 49 and the rear rail 48, respectively. Secured to the outer sides of the carriage side plates 45 at the rear of the carriage are extension plates 50 which project rearwardly into the plane of the ribbon spools 36 and 40 whereby the carriage overhangs the ribbon feeding mechanism which includes the rollers 23, 24 and other parts connected thereto. The carriage rotatably supports the usual platen 51 and is moved step-by-step during the writing of lines by escapement mechanism mounted on the rear rail 48. This escapement mechanism includes a pair of pawls 52 (Figs. 3, 6, and 7) which are shown in section in Fig. 6 and in dotted lines in Fig. 7. These pawls cooperate with the usual escapement rack 53 (Fig. 3) secured to the bottom of the channel-shaped member 46.

Pivotally mounted in the carriage adjacent side plates 45 at 54 are the usual carriage release levers 55, one of which is best shown in Fig. 3. The carriage release levers cooperate with a bail 56 which is pivotally mounted between the side plates 45. This bail engages the usual escapement release arm 57 which, as shown in Figs. 6 and 7, is provided with a lug 57a in a position to be engaged by the bail 56. The escapement release lever 57 also has a lug or arm 57b which is bent downwardly behind the rear rail 48 and underneath the rail as shown in Fig. 6 and then upwardly between the escapement pawls 52 and the rack 53. When the carriage release lever 55 is rocked in a counterclockwise direction (Fig. 3), the bail 56 is similarly rocked and, by engagement with the lug 57a, causes the arm 57 to rock about a vertical axis consisting of a stud 58 on the rear rail 48. This movement of the arm 57, through the cooperation of the lug 57b with the pawls 52, disengages the latter from the escapement rack 53 to permit the carriage to be moved by hand free of the escapement mechanism. As will be shown hereinafter, this movement also disables the feeding mechanism for the ribbon 36 so as to avoid waste of the ribbon when the carriage is manipulated by hand.

Figure 4:
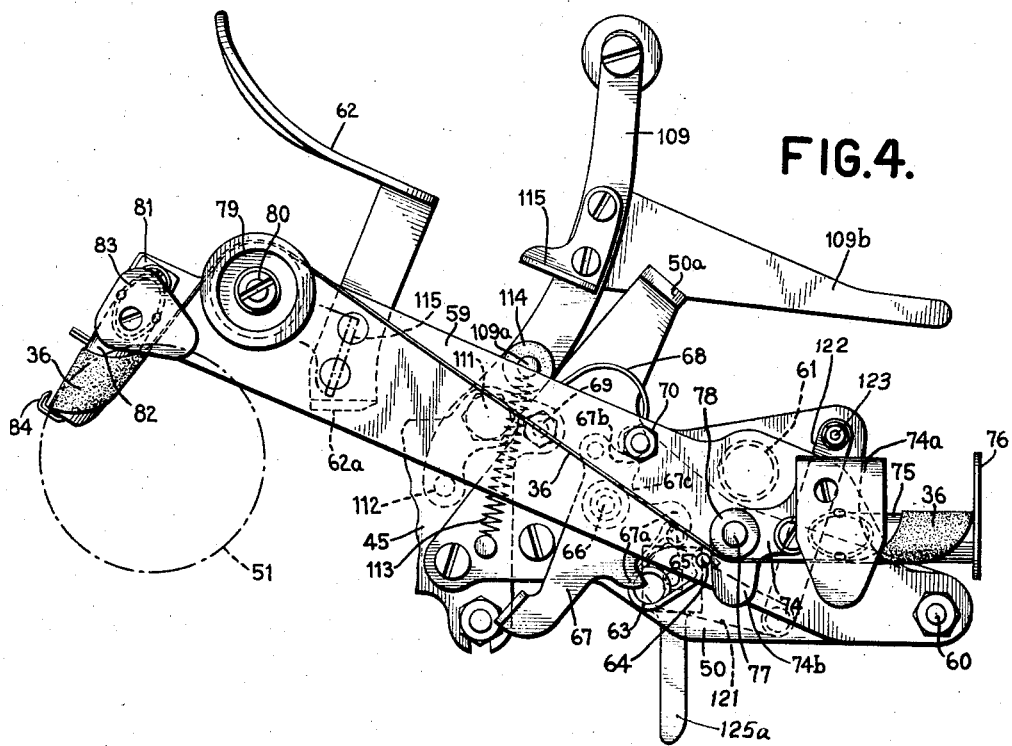
Fig. 4 is a right side elevation showing the ribbon supporting and guiding frame in writing position.

The ribbon 36 is supported and guided on the carriage by means of a ribbon supporting frame which includes two arms 59 (Figs. 1 to 5) which are pivotally mounted at 60 in the extension plates 50. The arms 59 are integrally joined together near their pivots 60 by a tube 61 which is welded or brazed to said arms. The right hand arm 59 (Fig. 1) is provided with a hand lever 62 (see Figs. 2 to 4) which is riveted or otherwise fastened to arm 59 for the purpose of raising the ribbon guiding frame when the ribbon 36 is to be shifted from a typing to a non-typing position. In order to limit the upward movements of the frame comprising the arms 59 and the tube 61, the plates 50 are provided with extensions having bent-over lugs 50a in the plane of the arms 59 so as to restrict their upward movements. For the purpose of yieldingly holding the frame 59 with the ribbon 36 in operative and inoperative positions, there is provided a pair of toggle springs 63 each associated with one of the arms 59. These toggle springs, as best shown in Figs. 3 and 4, are hooked around pins 64 carried by the arms 59 and pins 65 carried by the extension plates 50.

Provision is made for supporting the frame including the arms 59 in either of two typing positions for the purpose of completely utilizing the charged side of the ribbon 36. For this purpose a shaft 66 is rotatably mounted in the extension plates 50 (Figs. 1, 3 and 4) and secured to the ends of this shaft 66 are finger levers 67 by means of which the shaft may be rotated by hand. The finger levers 67 are formed with abutments 67a (Figs. 3 and 4) which coact with the studs 65 to limit rotation of the finger levers 67 and shaft 66. The finger levers 67 are held in the positions shown in Figs. 3 and 4 by means of a toggle spring 68 which is connected to a stud carried by one of the finger levers 67 to a cross rod 69 (see Figs. 1 and 2 also) which rigidly joins the carriage side plate 45 and also acts as a means of securing the extension plates 50 to the side plates 45.

Eccentric studs 70 (Figs. 3 and 4) are carried by the arms 59 and are so located on the arms as to cooperate with projecting portions 67b and notches 67c formed in the finger levers 67. When the finger levers are in the position shown in Fig. 3, the projecting portions 61b on the finger levers are in the arcuate paths of movement of the stud 70 whereby, when the frame including the arms 59 is lowered to typing position, the studs 70 will engage by the portion 67b and stop said frame in such a position that the bottom of the ribbon 36 will be along the writing line. On the other hand, when the finger levers 67 are moved rearwardly with reference to Fig. 1 or counterclockwise (Figs. 3 and 4) the studs 70 will enter the notches 67c and thereby the frame including the arms 59 is permitted to move further downwardly whereby the center of the ribbon 36 is brought to the writing line. It is thus possible to first use the ribbon so that the middle third thereof is exhausted, then rethread the ribbon and use it with the frame 59 set in the position of Fig. 4 whereby the lower third of the ribbon is exhausted. The ribbon may be rethreaded a second time and reused with the frame 59 in the position of Fig. 4 whereby the final third of the ribbon will be utilized. By this procedure the ribbon is exhausted of transfer material.

The frame including the arms 59 is provided with ribbon guides and guide rollers by means of which the ribbon is delivered to the carriage and along the writing line behind a work sheet wrapped around the platen 51. For the purpose of guiding the ribbon to the carriage from the roller 22 and from the carriage to the roller 42 there is provided a pair of guide rollers or pulleys 71a, 71b (Figs. 1 and 5) which are rotatably mounted on studs 72 carried by a bracket 73 which is secured to the tube 61 joining the arms 59. The bracket 73 is located at the middle of the tube 61 and the feed rollers 22, 42 are located far enough apart so that both the pulleys 71a, 71b always are between the feed rollers 22, 42 regardless of the position of the carriage. The ribbon 36 is guided to rollers 71a, 71b by means of guides 73a secured to bent-over lugs formed in bracket 73. The ribbon guides 73a are flared like the guide 39 and are C-shaped in section transversal of ribbon 36 so as to extend around the edges of the ribbon as shown in Fig. 1.

Figure 12:
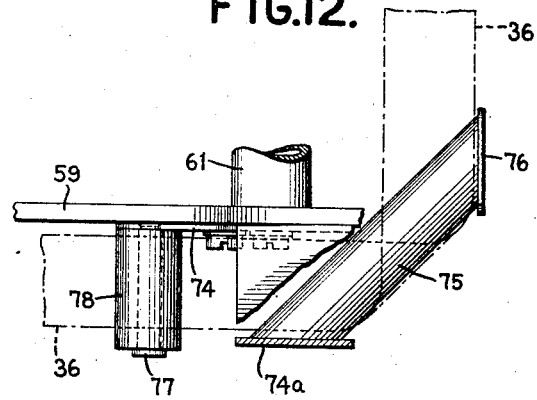
Fig. 12 is a large scale oblique view of one of the rear ribbon guides as viewed in the direction of the arrows 12—12 in Fig. 3.

As best shown in Figs. 1 and 5, the two stretches of ribbon 36 from the rollers 71a and the roller 71b, respectively, extend to right and left (Fig. 1) towards the rear ends of the extension plates 50. At these points the carriage is provided with rear ribbon guides one of which is shown on a large scale in Fig. 12. The ribbon guide includes a bracket 74 which is secured to the right hand arm 59 and is bent upwardly, outwardly, and downwardly like an inverted U. A cylindrical ribbon turning member 75 is secured to the outer downwardly extending arm 74a of the bracket and extends diagonally rearwardly towards the center line of the carriage at an angle of 45° to the right hand arm 59. Secured to the outer or free end of the turning member 75 is a flat oval guide plate 76. Rotatably mounted on a stud 77 carried by the bracket 74 is a guide roller 78.

The ribbon 36 extends from the roller 71a substantially horizontally to the right in Fig. 1 or to the left in Figs. 2 and 5 over the free end of the member 75, thence downwardly and forwardly under the forward end of the member 75, and then passes under the roller 78 as shown in Fig. 4. The plate 76 cooperates with the edge of the ribbon 36 to prevent it from slipping off the rear end of the turning member 75 and in a similar way the downwardly projecting portion 74a of the bracket 74 prevents the ribbon from slipping off the forward end of the ribbon guide 75 and from the roller 78. The bracket 74 is formed with an ear 74b which cooperates with the edge of the ribbon adjacent the inner end of roller 78.

The ribbon guide at the rear left hand corner of the machine (Fig. 1) which guides the ribbon to the lefthand roller 71b is similarly constructed but the positions of the parts are reversed in relation to the righthand ribbon guide.

Figure 11:
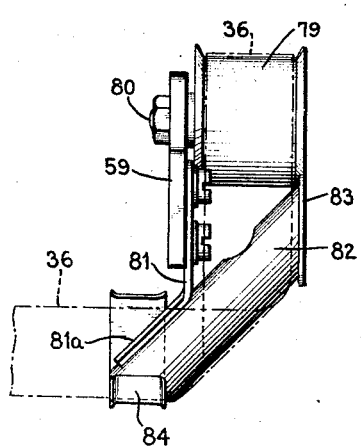
Fig. 11 is a large scale oblique view of one of the front ribbon guides as viewed in the direction of the arrows 11—11 in Fig. 3.

The forward ends of the arms 59 are provided with rollers 79 mounted on studs 80 which rollers guide the ribbon 36 to and from the front ribbon guides. The right hand front ribbon guide is best illustrated in Figs. 3, 4, and 11. The front ribbon guide comprises a bracket 81 which is secured to the side of the arm 59 and is formed with an arm 81a bent to the left (Figs. 1 and 11) toward the middle of the carriage at an angle of 45° to the plane of arm 59. Secured to the bent portion of the bracket 81 is a cylindrical turning member 82 similar to the members 75 and having a guide plate 83 secured to the right hand end of the member 82.

Secured to the member 82 adjacent to bracket 81 is a marginal guide element 84 (Figs. 3, 4 and 11) of which the lower portion is bent U-shaped so as to project partly around the lower edge of the ribbon 36 and upwardly approximately a third of the width of the ribbon. The upper portion of the marginal guide 84 is merely bent at right angles to the plane of the ribbon as best shown in Figs. 3 and 4. In order to prevent the edges of the marginal guide element 84 from stripping the transfer material from the ribbon 36 the edges which contact the ribbon 36 are flared in order to provide a smooth surface.

The left hand front ribbon guide (Fig. 1) is similarly constructed but, as in the case of the left hand rear ribbon guide, the parts are reversed in relation to the right hand front ribbon guide. A guide 39a, similar to the guides 73a, 73b and mounted on a bracket 39b fixed to casting 20, guides the ribbon 36 to roller 42.

The members 82 and the marginal guide elements 84 of the front ribbon guides direct the ribbon 36 in a horizontal straight stretch along the writing line in front of the platen 51 as in Fig. 1. When the ribbon supporting frame including the arms 59 is in the lower of the two typing positions the portion of the ribbon along the center thereof is at the typing line and the width of the ribbon is such that a strip comprising approximately a third of the width of the ribbon is utilized. When the ribbon is rethreaded and the frame including member 59 is positioned in its upper typing position, the lower third of the ribbon is utilized. It is obvious that if the ribbon is again rethreaded so that the exhausted edge portion is located above its original position, the third portion of the ribbon may be utilized by maintaining the frame including arms 59 in the uppermost typing position. Thus, by passing the ribbon through the machine three times, it is possible to utilize the entire width of the ribbon and thereby exhaust the ribbon completely without using any portion twice.

This is an important feature of applicant's invention because hectograph ribbons in particular are quite expensive and it is highly desirable to utilize every portion of the ribbon in the interests of economy. It is not practical to use any portion of a hectograph ribbon twice because, when the type strikes through a portion of the ribbon which has been previously utilized, certain portions of the letters on the master sheet will receive insufficient amounts of hectograph material or none at all. As a result, when the master sheets are utilized in the duplicating machine, certain letters will appear more faintly than others or fail to print entirely making the duplicate copies wholly or partly unintelligible.

After the ribbon has been exhausted of transfer material along one edge, it is merely necessary to interchange the spools 37 and 40 and turn over the spool 40 in order to utilize the edge portion of the ribbon opposite the exhausted edge. Conveniently the machine may be initially operated with finger levers 67 positioned as in Figs. 3 and 4 so that the ribbon is utilized along the lower edge and then reused by merely interchanging the spools 37 and 40 to utilize the ribbon along the other edge. Then the finger levers 67 may be set to utilize the central portion of the ribbon. However, this order is not absolutely vital to complete exhaustion of the ribbon as the operator can easily determine by inspection of the portion of the ribbon at the writing line how to set levers 67.

In preparing master sheets for duplicating machines which use the master sheet as the printing member, such as the "New Process" duplicator, a hectograph ribbon is used and is threaded through the machine so that the coated side faces away from the platen. In this case the ribbon is positioned behind the work sheet so that the hectograph material is deposited on the back of the sheet. Master sheets for machines using gelatine blankets or gelatine transfer rollers, such as the "Ditto" duplicator, are prepared by placing the ribbon in front of the work sheet with the coated side of the ribbon facing the work sheet. In preparing photo-lithomaster sheets, a special carbon ribbon is used and placed in front of the master sheet with the coated side facing the work sheet. Carbon copies may also be prepared by using an ordinary carbon ribbon between two sheets with the coated side facing the sheet next to the platen.

The movement of the carriage is utilized to rotate the feed rollers 22, 23, by means shown in Figs. 1, 2, 3, 5, and 6 to 10. The bracket 73 is provided with a bent over lug 73b to which is anchored both ends of a feed belt 85 in the form of a fabric tape. This feed belt 85 passes over the pulley 28 and around an idler pulley 86 rotatably mounted on a stud 87 located adjacent the feed roller 42. In order to maintain tension in the feed belt 85 there is provided a spring 85a (Figs. 2 and 5) of which one end is anchored to a clip 85b attached to the bent-over lug 73b. The other end of the spring 85a is anchored to the belt 85 in such a fashion as to maintain a slack loop in the belt. As the carriage moves to the left (Fig. 1) or to the right (Fig. 5) during the typing of a line, the feed belt 85 causes the feed rollers 22 and 23 to rotate in a direction to pay out the ribbon from the supply roll 37 to the left hand roller 71a in Fig. 5, the feed rollers 22 and 23 pulling the ribbon from the storage spool 37.

In order to maintain a tension on the ribbon 36 while the carriage moves in writing a line, there is provided a take-up device for rotating storage spool 40. This device includes a pulley 88 (Fig. 2) which is secured to a rotatable stud on which the storage spool 40 is mounted. A feed belt 89, which may be in the form of a coil spring, passes around the pulley 88 and under idler pulleys 90 carried by a bracket 91 secured to a flange on casting 20 and then around a pulley 91a (Fig. 1) mounted on or forming a part of the power roller 91b of the machine. The power roller thus always tends to rotate the take-up spool 40 in a clockwise direction (Fig. 2) but the tension of the belt 89 is such that the belt will slip when the ribbon is under tension. By this means the ribbon 36 is maintained under proper tension in the ribbon guides when the carriage is stationary and is automatically wound on the storage spool 40 while the carriage is moving.

In order to prevent reverse rotation of the feed rollers 22, 23 and pulley 42 there is provided a pawl 92 (Figs. 5, 9, and 10) cooperating with the ratchet 29 and a pawl 93 cooperating with the ratchet 44. These pawls are rotatably mounted on studs 94, 95 respectively, carried by casting 20. The pawls 92, 93 are actuated by torsion springs like 92a in Figs. 9 and 10 which illustrate the mounting of the pawl 92 associated with the ratchet 29.

Owing to the high cost of hectograph ribbon it is desirable that the feeding of the ribbon be prevented during operations of the machine which do not include typing, as during tabulating operations or when the carriage is moved by hand. Obviously, if no means were provided to prevent such action the moving of the carriage to the left (Fig. 1) by hand or in tabulating would cause the ribbon to feed an extent corresponding to the amount of movement of the carriage since the ribbon travels with the carriage and the rollers 22, 23 are actuated by the carriage movement. The means for preventing the feeding of the ribbon is controlled by the lever 57 (Fig. 7) which is operated to disengage the feed pawls 52 each time the carriage is tabulated or moved by hand. Pivotally mounted on the studs 94 and 95 (Figs. 5, 9, and 10) are detent pawls 96 which are designed to engage the teeth in the ratchets 29, 44 so as to prevent rotation of the feed rollers 22, 23 and pulley 42. The pawls are operated by a system of links and arms which includes links 97 connected to arms formed in the pawls 96 and to arms 98 (Figs. 1, 2, 5, 6, and 7) loosely mounted on a vertical shaft 99 located near the center line of the machine and journaled in vertically aligned bearings comprising holes formed in the casting 20 as best shown in Fig. 5. The shaft 99 is rotatably supported on a thrust bearing consisting of a ball 100. Secured to shaft 99 below the arms 98 is an arm 101 on which is mounted a long pin 102 which extends upwardly through the planes of both arms 98. Springs 103, anchored to studs carried by the arms 98 and to the pin 102, pull the arms 98 into engagement with the pin 102. Secured to the upper end of the shaft 99 is a lever 104 to which is connected a link 105. This link extends toward the front of the machine and into engagement with the downward projecting portion of arm 57 behind the rear rail 48. The free end of the link 105 passes through a hole in the cover plate 106 (Fig. 3) at the rear of the machine. This cover plate is L-shaped in vertical section so as to have a vertical flange extending parallel with the carriage in which vertical flange is located the hole which guides the link 105 as shown in Figs. 2 and 3. A spring 107 (Figs. 2 and 5), anchored to a stud carried by the casting 20 and to the right hand detent 96 with reference to Fig. 5, serves to maintain the mechanism including the links 97 in a position with the detents 96 disengaged from the ratchets 29 and 44 and with the free end of link 105 abutting the arm 57 as in Figs. 6 and 7.

The tabulator lever 108 which cooperates with lug 57c formed in arm 57 is actuated during each tabulating operation in a direction to move the left hand end of the arm 57 (Fig. 7) counterclockwise in this figure thereby pushing the link 105 rearwardly of the machine with reference to Fig. 1. This causes the shaft 99 to rock in a counterclockwise direction (Figs. 1 and 7) thereby causing the links 97 to move to the right in Figs. 5 and 7 or to the left in Fig. 1. As a result, the detents 96 are also rocked in a counterclockwise direction (Fig. 5) to bring the noses of the detents into engagement with the ratchets 29 and 44 thereby locking said ratchets and the rollers 22, 23, 42 against rotation and preventing feeding of the ribbon. The same action takes place whenever one of the carriage release levers 55 is operated to permit moving the carriage by hand. The spring 85a stretches slightly when the carriage is moved in a letter writing direction, and permits the feed belt 85 to slip on the pulley 26.

The carriage is provided with a paper bail for the purpose of holding work sheets against the platen. This paper bail is shown in Figs. 1, 3, and 4 and includes a pair of arms 109 joined by a rod 110. The arms 109 are pivoted upon studs 111 on the carriage side plates 45. The arms 109 are rigidly joined together adjacent the studs 111 by a tie rod 112. Springs 113 anchored to pins carried by the extension plates 50 and to studs 109a on the arms 109 are operative in a well known way to hold the paper bail in either its raised position as shown in Fig. 4 or in cooperation with the platen as in Fig. 3. Mounted on the studs 109a are collars 114 of resilient material such as rubber in the plane of the extension plates 50. These plates cooperate with the rubber collars to limit clockwise movement of the arms 109 in Figs. 3 and 4. The collars 114 act as cushions to prevent damage to the paper bail in the event that it is snapped back rapidly by operator of the machine.

It is desirable that the machine be capable of use as a correspondence machine and for general office work. It is desirable, therefore, that means be provided to prevent the lowering of the ribbon guiding frame including the arms 59 to either of the typing positions when the paper bail is in cooperation with the platen in order to prevent tearing of the hectograph ribbon. It is also desirable that when the machine is used in preparing a hectograph master sheet that the paper bail be raised automatically whenever the ribbon guiding frame is raised to non-typing position as otherwise the paper bail will obstruct the free movement of the ribbon and result in tearing the ribbon since it is only thin coated paper. Accordingly, means is provided which has the dual purpose of causing the paper bail to be raised automatically when the ribbon supporting frame is raised to non-typing position and of preventing the lowering of the ribbon frame when the paper bail is in cooperation with the platen.

This means comprises a bracket 115 secured to the side of right arm 109 of the paper bail as shown in Figs. 1, 3, and 4. The hand lever 62 is formed with a bent-over lug 62a designed to cooperate in two different ways with bracket 115. When the paper bail is in cooperation with the platen and the frame comprising arms 59 is in the non-typing position as in Fig. 3, the bracket 115 is in the arcuate path of movement of the lug 62a whereby, if it is attempted to lower the frame including members 59, the bracket 115 will prevent the frame from being lowered more than part way by engagement of said bracket with the lug 62a as shown by broken lines (Fig. 3). On the other hand, if both the paper bail and the frame including the arms 59 are in typing position, the lug 115 will occupy a position just over the lug 62a as shown by broken lines (Fig. 4), whereby, as the frame is raised, the paper bail will likewise be raised.

The paper bail swings on a considerably shorter radius than the ribbon supporting frame whereby it is possible for the lug 62a to pass the lug 115 when the paper bail is in such position that the spring 113 can draw the paper bail to the raised position shown in Fig. 4. In this figure, the broken lines indicate the position of the lug 115 in relation to the lug 62a when both the paper bail and the ribbon guiding frame are in position to cooperate with the platen. In Fig. 3 the dot and dash line indicates the position of the lug 62a, when by cooperation thereof with bracket 115, movement of the ribbon guiding frame is limited an extent sufficient to prevent the ribbon 36 from engaging the paper bail.

One advantage of the ribbon feeding mechanism disclosed herein over the mechanism disclosed in the Petz application is that the feeding of the ribbon is more closely controlled and consequently is more accurate. In the Petz application the rollers which positively feed the tape are located between the storage spool and the side of the carriage at which the ribbon is discharged and the rollers merely act to take up the slack resulting from the movement of the carriage in letter spacing direction. The unwinding of the ribbon from the supply roll is to some extent dependent upon the pull exerted by the carriage upon the tape at the delivery side of the carriage in consequence of the friction exerted by the ribbon guides upon the tape. The movement of the carriage is very rapid and that the ribbon supply spool has a relatively large inertia effect, particularly when full, which tends to cause the supply spool to rotate more than necessary whereby to produce a slack in the ribbon tending to make it sag at the writing line or even tending to cause the ribbon to be broken when a twisting force is exerted thereon during the line spacing movement of the platen. The tendency of the supply spool to over-rotate is to some extent prevented in the Petz application by a spring which frictionally cooperates with the roll of ribbon on the spool to retard rotation of the ribbon spool. This, however, tends to aggravate the tendency to break the ribbon due to the inertia of the supply spool.

In the machine described herein the supply spool is free to rotate and the ribbon is paid out to the carriage exactly the same amount as the carriage moves and at the same time the automatic rewind drive for storage spool keeps the ribbon under tension so as to maintain it taut in a straight line at the writing line thereby eliminating any tendency for the ribbon to sag or move with the master sheet in line spacing operations. No dependency in the present case is placed upon the friction of the ribbon guides to unwind the ribbon from the spool but the carriage, through the driving belt, effects this function directly and by a uniform amount for each letter spacing operation. In the Petz application the ribbon remains practically slack at the writing line since the only factor tending to keep it taut is the friction of the guides.

Another advantage is that the supporting frame for the ribbon feeding mechanism need be only approximately half the length of the corresponding frame in the Petz application by virtue of the fact that the ribbon is delivered to the carriage and is discharged from the carriage at a point near the center of the machine instead of at points near the limits of the carriage travel in each direction. Thus, the machine may be made considerably lighter and more cheaply. The real advantage of this construction, however, is that the machine takes up considerably less space and is therefore much easier to ship and provides more space on the operator's desk for other things. Due to the improved construction of the ribbon guides and ribbon turning members, the scraping of the transfer material of the ribbon is reduced to a negligible amount. Actual experience with the machine disclosed in the Petz application showed that the scraping of a transfer material in the form of fine dust which floated around in the air and settled upon adjacent desks and upon the operator proved a very serious objection to the use of these machines because the hectograph transfer material spreads when moistened and it was found that it caused damage to the operator's clothing and to persons working adjacent the machine besides soiling documents and records.

Figure 13:
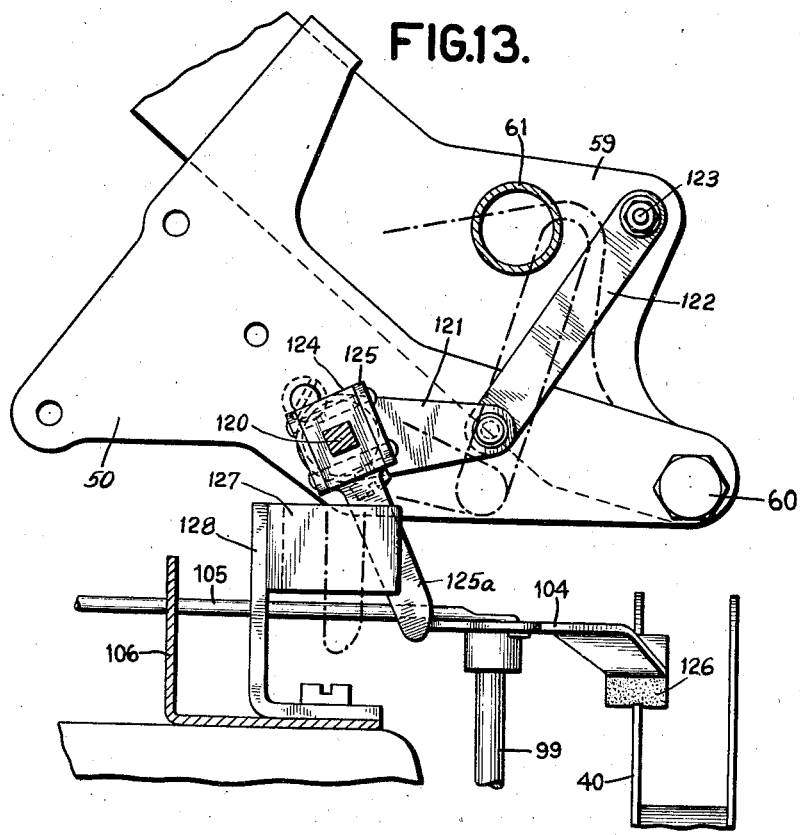
Fig. 13 is a large scale vertical section on the line 13—13 in Fig. 1.
Figure 14:
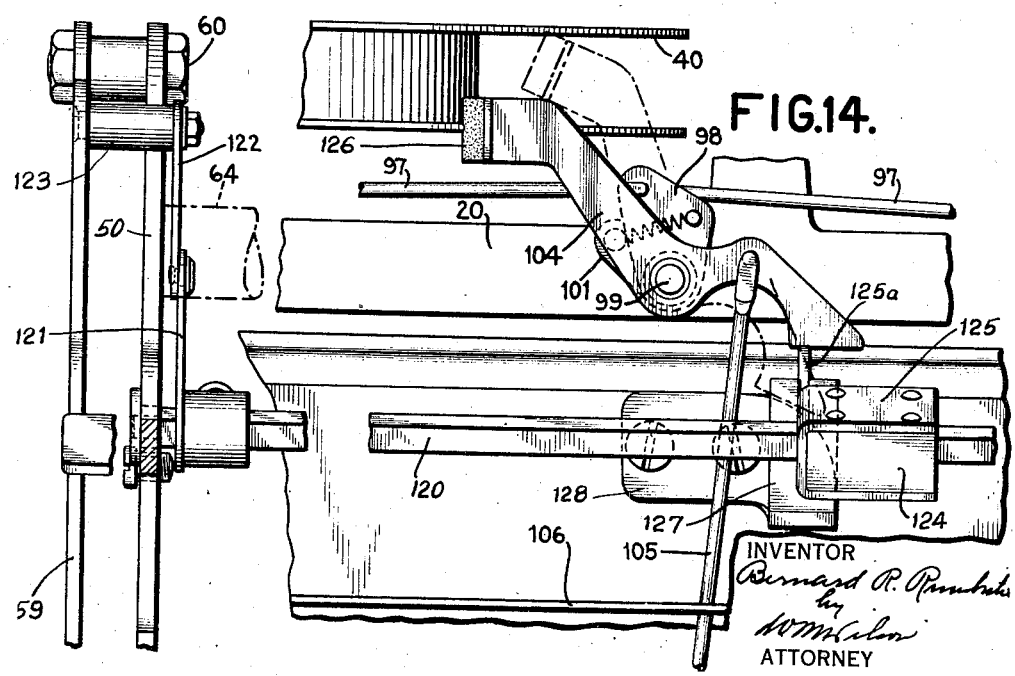
Fig. 14 is a large scale plan view of the mechanism shown in section in Fig. 13.

The means for preventing the feeding of the ribbon when the machine is not being used for the preparation of master sheets and for other work requiring the use of the auxiliary ribbon 36 is most clearly shown in Figs. 1, 13 and 14. This means is rendered effective automatically when the ribbon carrying frame including the arms 59 is raised to the position shown in Fig. 3. Journaled in the extension plates 50 (Figs. 1, 13 and 14), is a square shaft 120 to which is secured an arm 121 connected by a link 122 to a post 123 on the right-hand arm 59. Slidably mounted on the shaft 120 is a block 124 to which is secured a bracket 125 having an arm 125a which engages the end of one arm of lever 104. This lever, it will be remembered, when rocked in a counterclockwise direction (Fig. 7) causes the links 97 (Fig. 5) to be moved to the right, thereby through the dogs 96, locking the ratchet wheels 29 and 44 against rotation to prevent feeding of the ribbon.

When the auxiliary ribbon 36 is in use, the arms 59 will occupy the position shown in Fig. 4, thereby holding the arm 125 in the position shown by solid lines in that figure and by broken lines in Fig. 13. This allows the lever 104 to assume the position shown by solid lines (Fig. 7) and by broken lines (Fig. 14) permitting the ribbon feeding mechanism to operate when the carriage moves. When the arms 59 are moved to the position shown by solid lines in Figs. 3 and 13, the arm 125a is rocked in a counterclockwise direction (Fig. 13) and thereby rocks the lever 104 in a counterclockwise direction (Fig. 14). This causes the links 97 to be moved to the left (Fig. 14) or to the right (Fig. 5) to lock the ratchet wheels 29 and 44 against rotation.

It is also desirable to prevent the storage spool 40 from rotating when the ribbon feeding mechanism is locked against operation. For this purpose, one arm of lever 104 is provided with a block 126 formed of resilient material like sponge rubber whereby, when the lever 104 is rocked to the position shown by solid lines in Fig. 14, the block 126 will contact the edge of one of the sides of the storage spool 40 and thereby prevent the storage spool for tending to rotate under the influence of the driving force exerted by the spring belt 89. Thus, the portions of the ribbon between the storage spool 40 and the feed rollers 22, 23 is relieved of tension produced by the take-up mechanism. This also has the advantage that, in the event of the operator's removal of the ribbon 36 from the ribbon guides on the carriage, for his or her complete freedom from the possibility of interference with the ribbon during an extensive period of general correspondence writing or in the event of breakage of the ribbon, the storage spool 40 will not be allowed to spin under the driving force of belt 89.

The block 124 and the bracket 125 are held in the position of Fig. 4 in the proper relationship to lever 104 by means of a guide block 127 secured to bracket 128 which is fixed to the cover plate 106. The block 127 has a slot through which the arm 125a passes whereby said arm and the block 124 to which it is fastened may rotate with reference to the longitudinal axis of shaft 120, but are prevented from moving with the carriage. Thus, regardless of the position of the carriage, the arm 104 will be rocked in a counterclockwise direction (Fig. 14) whenever the arms 59 are moved from the position of Fig. 4 to the position of Figs. 3 and 13.

It is difficult to grasp the paper bail comprising arms 109 and rod 110 while the parts are in the position of Fig. 3 and move the paper bail to the position of Fig. 4 without breaking the ribbon 36. Accordingly, there is provided a finger piece 109b (Figs. 1 to 4) which is long enough, and projects upwardly (Fig. 3) far enough, to enable the paper bail to be operated without risk of tearing the ribbon.

While there has been shown and described and pointed out the fundamental novel features of the invention as applied to a single embodiment it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a machine of the class described, in combination with the carriage, ribbon storage and supply rolls mounted at the rear of the carriage and independently thereof, a pair of feed rollers mounted independently of the carriage and operative to pay out the ribbon from the supply roll, a guide roller for receiving the ribbon and guiding it to the storage roller, means whereby the carriage in its letter spacing movement operates the feed rollers to pay out the ribbon in step with the carriage, ribbon guiding means located at the ends of the carriage, ribbon guides mounted on the carriage and located substantially midway between the ends of the carriage for guiding the ribbon from the feed rollers to the guiding means at one end of the carriage and from the guiding means at the other end of the carriage to the guide roller, means on the carriage for guiding the ribbon along the writing line, and means for rotating the storage roll to take up the slack produced in the ribbon in its movement in letter spacing direction, said means being operative to maintain the ribbon under tension along the writing line.

2. In a machine of the class described, in combination with the frame of a typewriting machine a carriage mounted on the frame, ribbon storage and supply rolls mounted on said frame at the rear of the carriage, means mounted on said frame for unwinding the ribbon from the supply roll, a guide roller for receiving the ribbon from the carriage and guiding the ribbon to the storage roll, ribbon guides located at substantially the mid-point of the carriage for receiving the ribbon fed by the feeding means and for guiding the ribbon from the carriage to the guide roller, ribbon guiding means located at the ends of the carriage for receiving the ribbon from the first-named guides and guiding the ribbon to the writing line and for guiding the ribbon from the writing line to the first-named guiding means, means for guiding the ribbon along the writing line in a straight stretch from one end of the carriage to the other, means actuated by the carriage in its letter spacing movement for operating the feeding means to pay the ribbon out to the carriage, and means to rotate the storage roll to take up the slack in the ribbon produced by the spacing movement of the carriage and operative to maintain tension on the ribbon at the writing line.

3. In combination with the carriage for typewriting machines, a platen mounted on the carriage, ribbon supporting and guiding means on the carriage for guiding a ribbon in a straight stretch along the writing line on the platen, means to move the ribbon guiding means to an inactive position remote from the writing line, a paper holding bail mounted in the carriage and movable from a position in cooperation with the platen to an inactive position, and means operative to prevent movement of the ribbon guiding means to bring the ribbon into its active position when the paper holding bail is in cooperation with the platen.

4. In combination with the carriage for typewriting machines, a platen mounted on the carriage, a ribbon supporting and guiding frame movably mounted in the carriage, ribbon guiding means on said frame for guiding a ribbon in a straight stretch along the writing line, means to move the ribbon guiding frame to an inactive position, a paper holding bail movable into and out of cooperation with the platen, and means to cause the paper holding bail to be moved out of cooperation with the platen when the ribbon guiding frame is raised to its inactive position, said means being also operative to prevent moving the ribbon guiding frame into its active position when the paper holding bail is in cooperation with the platen.

5. In combination with the frame of a typewriting machine, a carriage mounted on the frame, a supplemental frame mounted on the main frame, ribbon storage and supply spools mounted on the supplemental frame, feed rollers mounted at one end of said supplemental frame, a guide roller mounted at the other end of said supplemental frame and operative to guide the ribbon to the storage spool, ribbon guiding means located substantially midway between the ends of the carriage for guiding the ribbon from the feed rollers to the carriage and from the carriage to the second-named roller, means on the carriage for receiving the ribbon from the last-named guiding means and guiding the ribbon thereto and for guiding the ribbon along the writing line, means to operate said feed rollers in step with the letter spacing movement of the carriage whereby said ribbon is paid out to the carriage from the supply spool as the carriage moves in letter spacing direction, means to take up the slack in the ribbon between the second-named roller and the carriage produced by the movement of the carriage in letter spacing direction.

6. In combination with the frame of a typewriting machine, a carriage mounted on the frame, a supplemental frame mounted on the main frame, ribbon storage and supply spools mounted on the supplemental frame, feed rollers mounted at one end of said frame, a guide roller mounted at the other end of said frame and operative to guide the ribbon to the storage spool, ribbon guiding means on the carriage and located substantially midway between the ends of the carriage for guiding the ribbon from the feed rollers to the carriage and from the carriage to the second-named roller, means on the carriage for receiving the ribbon from the last-named guiding means and guiding the ribbon thereto and for guiding the ribbon along the writing line, means to operate said feed rollers in step with the letter spacing movement of the carriage whereby said ribbon is paid out to the carriage from the supply spool as the carriage moves in letter spacing direction, means to take up the slack in the ribbon between the second-named roller and the carriage produced by the movement of the carriage in letter spacing direction, carriage release levers and means controlled by the carriage release levers for locking said rollers against rotation whereby to prevent feeding of the ribbon when the carriage is moved by hand.

7. In combination with the frame of a typewriting machine, a carriage mounted on the frame, a supplemental frame mounted on the main frame, ribbon storage and supply spools mounted on the supplemental frame, feed rollers mounted at one end of said supplemental frame, a guide roller mounted at the other end of said supplemental frame and operative to guide the ribbon to the storage spool, ribbon guiding means located substantially midway between the ends of the carriage for guiding the ribbon from the feed rollers to the carriage and from the carriage to the second-named roller, means on the carriage for receiving the ribbon from the last-named guiding means and guiding the ribbon thereto and for guiding the ribbon along the writing line, means to operate said feed rollers in step with the letter spacing movement of the carriage whereby said ribbon is paid out to the carriage from the supply spool as the carriage moves in letter spacing direction, means to take up the slack in the ribbon between the second-named roller and the carriage produced by the movement of the carriage in letter spacing direction, escapement mechanism for the carriage, means to release the escapement mechanism to permit the carriage to run free and means automatically effective concurrently with the release of the escapement mechanism for locking the feed rollers against operation when the carriage is released from the escapement mechanism.

8. In combination with the carriage of a typewriting machine, ribbon feeding mechanism mounted independently of the carriage, a ribbon supporting and guiding frame movably mounted in the carriage and supporting the ribbon along the writing line, said frame being movable to carry the ribbon from an operative to an inoperative position, and means controlled by the movement of the ribbon supporting frame to the inoperative position for positively preventing operation of the ribbon feeding mechanism.

9. In combination with the carriage of a typewriting machine, means to support an auxiliary ribbon on the carriage for movement to and from an operative position in which the ribbon extends along the writing line, a ribbon feeding mechanism, and locking means controlled by movement of the ribbon to an inactive position to disable the feeding mechanism.

10. In combination with the main frame and the carriage of a typewriting machine, a ribbon supporting frame movably mounted on the carriage so as to enable the displacement of a ribbon supported by the ribbon frame from an active position along the writing line to an inactive position remote from the writing line, means on said frame for supporting and guiding the ribbon, ribbon feeding mechanism mounted on the main frame and including a pair of feed rollers for paying out the ribbon to the carriage, means connected to the carriage for actuating the feed rollers whereby to pay the ribbon out to the carriage in step with its letter spacing movement, locking means operable to prevent actuation of the feed rollers by said carriage, and connections between said frame and the locking means for rendering the latter effective when the ribbon supporting frame is moved to the inactive position.

11. In combination with the carriage of a typewriting machine, a ribbon feeding mechanism mounted independently of the carriage and relative to which the carriage moves, ribbon supporting and guiding means movably mounted in the carriage for movement from an active position in which a stretch of the ribbon lies along the writing line to an inactive position in which the ribbon is remote from the writing line, means on the carriage to guide the ribbon from the feeding means to the carriage to permit movement of the carriage without disarranging the ribbon, means associated with the ribbon feeding mechanism for rendering it inoperative including an element having a sliding connection with the carriage, and means on the carriage connected to the ribbon supporting means for actuating said element.

12. In combination with the carriage of a typewriting machine, ribbon supporting and guiding means mounted in the carriage for supporting an auxiliary ribbon along the writing line, said guiding means being movable to permit shifting of the ribbon to an inactive position; ribbon feeding means mounted independently of the carriage and including a pair of feed rollers operable to pay out the ribbon to the carriage as the carriage moves in a letter-spacing direction, means to guide the ribbon from the feeding means to the carriage adapted to permit the carriage to move without disarranging the ribbon, means connecting the feed rollers to the carriage for operating the feeding means when the carriage moves in a letter-spacing direction whereby to prevent relative movement between the ribbon and the carriage to maintain a stretch of said ribbon immovable along the writing line, and means mounted independently of the carriage for maintaining the ribbon under tension along the writing line.

13. In combination with the carriage of a typewriting machine, a platen rotatably mounted in the carriage; ribbon supporting and guiding means movably mounted in the carriage and adapted to support a stretch of ribbon along the writing line on the platen, said ribbon supporting means being movable from an active position, in which the ribbon lies in front of the platen and along the writing line, to an inactive position in which the ribbon is clear of the platen; pressure rollers movably mounted on the carriage and adapted to be brought into an operative relation with the platen to feed a work sheet, and interlocking means between said pressure rollers and the ribbon supporting and guiding means to prevent movement of the ribbon supporting means to the active position when the pressure rollers are in operative relation with the platen.

14. In combination with the main frame and carriage of a typewriting machine, ribbon supporting and guiding means mounted in the carriage for movement to carry the ribbon from an active position to an inactive position, ribbon feeding means mounted on the main frame and including a pair of ribbon feed rollers, means including a flexible band connecting the feed rollers to the carriage for actuating said rollers when the carriage moves in a letter spacing direction, and means rendered operative by movement of the ribbon supporting and guiding means to the inactive position for locking the feed rollers against operation.

15. In combination with the carriage of a typewriting machine, means to support and guide a ribbon along the writing line; a frame for supporting the guiding means, said frame being movable to carry the ribbon from an active position along the writing line to an inactive position; ribbon storage and supply spools mounted independently of the carriage, ribbon feeding mechanism including a pair of feed rollers for withdrawing the ribbon from the supply spool and paying out said ribbon to the guiding means on the carriage, means to guide the ribbon from the guiding means on the carriage to the storage spool, power operated means for actuating the storage spool to take up slack produced in the ribbon by letter spacing movement of the carriage and to maintain the ribbon under tension, and means controlled by movement of the frame for rendering the ribbon feeding mechanism inoperative when said frame is moved to carry the ribbon to the inactive position.

16. In combination with the main frame and carriage of a typewriting machine; means to support and guide a ribbon in a straight stretch along the writing line, said means being movable to carry the ribbon from an active position along the writing line to an inactive position remote from the writing line; ribbon feeding mechanism mounted on the main frame and operative to pay out the ribbon to the carriage as the carriage moves in a letter spacing direction, and means including an articulated connection between the ribbon supporting means and the feeding mechanism for rendering the ribbon feeding means inoperative when the supporting means is moved to the inactive position.

BERNARD R. RUMBUTIS.